United States Patent
Zhou

(10) Patent No.: US 8,428,170 B2
(45) Date of Patent: Apr. 23, 2013

(54) METHOD FOR TRANSMITTING MULTI-ANTENNA SUPERIMPOSED SYMBOL AND APPARATUS USING THE SAME

(75) Inventor: Hanbing Zhou, Beijing (CN)

(73) Assignees: Samsung Electronics Co., Ltd., Suwon-si (KR); Beijing Samsung Telecom R&D Center, Beijing (CN)

( * ) Notice: Subject to any disclaimer, the term of this patent is extended or adjusted under 35 U.S.C. 154(b) by 416 days.

(21) Appl. No.: 12/660,235

(22) Filed: Feb. 23, 2010

(65) Prior Publication Data

US 2010/0220809 A1    Sep. 2, 2010

(30) Foreign Application Priority Data

Feb. 23, 2009  (CN) .......................... 2009 1 0007563

(51) Int. Cl.
*H04B 7/02* (2006.01)
*H04L 1/02* (2006.01)

(52) U.S. Cl.
USPC ........... 375/267; 375/260; 455/132; 455/137; 455/138; 455/139

(58) Field of Classification Search .................. None
See application file for complete search history.

(56) References Cited

U.S. PATENT DOCUMENTS

| | | | |
|---|---|---|---|
| 2004/0042570 A1* | 3/2004 | Cochran et al. | 375/346 |
| 2005/0259568 A1* | 11/2005 | Yeh et al. | 370/208 |
| 2008/0219370 A1* | 9/2008 | Onggosanusi et al. | 375/260 |
| 2009/0196214 A1* | 8/2009 | Li et al. | 370/315 |

* cited by examiner

*Primary Examiner* — Kabir A Timory
*Assistant Examiner* — Gina McKie

(57) ABSTRACT

A method for transmitting symbols in a communication system, includes dividing N symbols to be transmitted at one time into 2 groups. A first processing is performed on each of a plurality of symbols in a first group in order to obtain a first group of superimposed symbols. A second processing is performed on each of a plurality of symbols in a second group to obtain a second group of superimposed symbols. Each of the first group of superimposed symbols is transmitted one by one by a first antenna, and corresponding symbols in the second group of superimposed symbols are transmitted by a second antenna. The first processing and the second processing respectively include a conjugate cancellation operation.

10 Claims, 3 Drawing Sheets

METHOD FOR TRANSMITTING MULTI-ANTENNA SUPERIMPOSED SYMBOL AND APPARATUS USING THE SAME

CROSS-REFERENCE TO RELATED APPLICATION(S) AND CLAIM OF PRIORITY

The present application is related to and claims priority to an application entitled "METHOD FOR TRANSMITTING MULTI-ANTENNA SUPERIMPOSED SYMBOL AND APPARATUS USING THE SAME" filed in the Chinese Intellectual Property Office on Feb. 23, 2009 and assigned Serial No. 200910007563.2, the contents of which are incorporated herein by reference.

TECHNICAL FIELD OF THE INVENTION

The present invention relates to a encoding method for communication systems, more specifically, to a method of encoding and transmitting multi-antenna superimposed symbols with high transmission rate and an apparatus using the same.

BACKGROUND OF THE INVENTION

Future wireless communication systems will be a system with high transmission rate and high reliability. Meanwhile, receiver complexity must be within an acceptable range. ITU's IEEE802.16 Serial Standard is a standard series which especially address wireless access problems. IEEE802.16 has attracted wide attention and been closely studied worldwide.

In the IEEE802.16e proposal, multi-antenna systems for an OFDMA will be improved in terms of transmission rate and receiver complexity. Taking a coding matrix C of IEEE802.16e, which has the highest transmission rate as an example, the coding matrix can be represented by Equation 1:

$$c = \frac{1}{\sqrt{1+r^2}} \begin{pmatrix} s_i + jr \cdot s_{i+3} & r \cdot s_{i+1} + s_{i+2} \\ s_{i+1} - r \cdot s_{i+2} & jr \cdot s_i + s_{i+3} \end{pmatrix},$$ [Eqn. 1]

$$r = \frac{-1+\sqrt{5}}{2}$$

For this solution, at a Timing i, Transmitting antenna 1 and Transmitting antenna 2 respectively transmit $[s_i+jr \cdot s_{i+3}, s_{i+1}-r \cdot s_{i+2}]$. At Timing i+1, Transmitting antenna 1 and Transmitting antenna 2 respectively send $[r \cdot s_{i+1}+s_{i+2}, jr \cdot s_i+s_{i+3}]$, where j=sqrt(-1), $s_i$ is a modulated symbol sent at Timing i.

However the conventional solution has the following problems:

Firstly, in IEEE802.16e, according to OFDMA spatial-temporal encoding scheme, a coding transmission rate R of the coding solution is equal to '2', which is relatively low. Secondly, in IEEE802.16e, when the above solution is adopted, a maximum likelihood sequential decoding algorithm complexity of the receiver reaches M4. For high dimensional modulation levels, the decoding method suffers from poor practicality. The high operational complexity means a too high requirement for the devices.

SUMMARY OF THE INVENTION

To address the above-discussed deficiencies of the prior art, it is a primary object to provide a method for transmitting symbols with a transmission coding rate (R) of '2.67' and an apparatus using the same.

According to one aspect of the present invention, a method for transmitting symbols in a communication system, comprising steps of: dividing N symbols to be transmitted at one time into 2 groups, performing a first processing on each of a plurality of symbols in a first group to obtain a first group of superimposed symbols, and performing a second processing on each of a plurality of symbols in a second group to obtain a second group of superimposed symbols; transmitting each of the first group of superimposed symbols one by one by a first antenna, and transmitting corresponding symbols in the second group of superimposed symbols by a second antenna; wherein, the first processing and the second processing respectively include a conjugate cancellation operation.

According to another aspect of the present invention, an apparatus for transmitting symbols in a communication system, comprising: a receiving means that receives symbols; a coding means that encodes the received symbols, and a plurality of antennas that transmits coded symbols; the coding means divides N symbols to be transmitted at one time into two groups, performs a first processing on each of a plurality of symbols to obtain a first group of superimposed symbols, and performs a second processing on each of a plurality of symbols in the second group to obtain a second group of superimposed symbols;

a first antenna transmits each of the first group of superimposed symbols one by one, and a second antenna transmits corresponding symbol in the second group of superimposed symbols, wherein the first processing and the second processing respectively include a conjugate cancellation operation.

Embodiments of the coding solution of the present invention provide a high coding transmission rate and achieve a complexity of 4M2 at the receiver. Under high dimensional modulation, such as 16QAM modulation where M=16. In addition, compared with IEEE802.16e, regarding an error code rate at the receiver, the method of the present invention is better than the maximum likelihood sequential decoding algorithm for IEEE802.16e.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system. According to the IEEE802.16e proposal, the coding matrix c solution for the multi-antenna BS end of OFDMA systems is defined according to Equation 1:

$$c = \frac{1}{\sqrt{1+r^2}} \begin{pmatrix} s_i + jrs_{i+3} & rs_{i+1} + s_{i+2} \\ s_{i+1} - rs_{i+2} & jrs_i + s_{i+3} \end{pmatrix} \quad [\text{Eqn. 1}]$$

$$\text{where, } r = \frac{-1 + \sqrt{5}}{2}$$

According to the solution, the codes of two adjacent transmitted symbols are rotated and then superimposed. At every timing interval, the superimposed code is transmitted. The advantage of this solution lies in that the transmission rate may be increased and the coding rate may be increased up to R=2, which is higher than the Alamouti coding solution.

Although this coding solution increases the transmission rate, some potential simplification of the coding matrix is not considered. According to the present invention, it is possible to add conjugate cancellation factors into the coding matrix to simplify design at the receiver.

The coding matrix added with simplification factors is according to Equation 2:

$$C = \begin{bmatrix} as_1 + bs_2 + cs_3 + ds_4 & -(e^*s_5^* + f^*s_6^* + g^*s_7^* + h^*s_8^*) \\ as_5 + bs_6 + cs_7 + ds_8 & e^*s_1^* + f^*s_2^* + g^*s_3^* + h^*s_4^* \end{bmatrix} \quad [\text{Eqn. 2}]$$

where a, b, c, d, e, f, g and h are weighted factors and the complex constants known to both the transmitting and receiving sides, also be regarded as a code book. In Equation 2, four adjacent transmitted symbols are superimposed to further increase the transmission rate and the coding transmission rate up to R=4.

Figure 1:
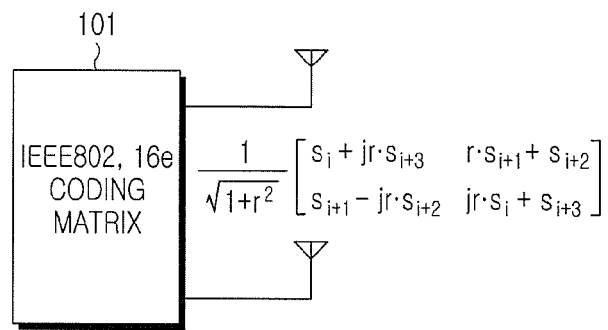
FIG. 1 illustrates a conventional coding method for IEEE802.16e.
Figure 2:
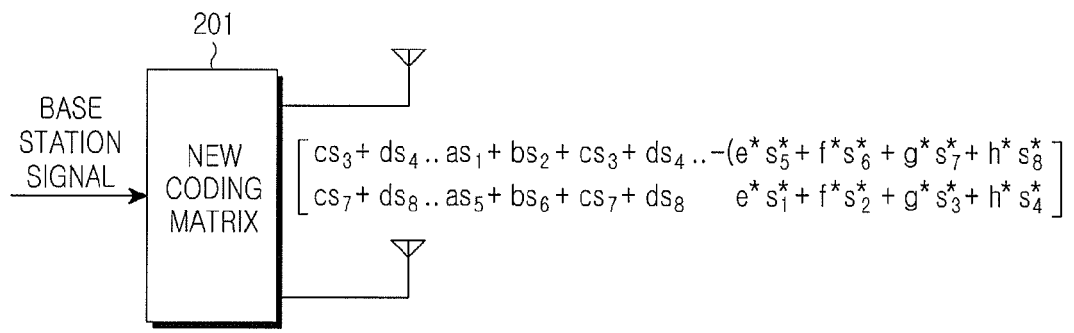
FIG. 2 illustrates a coding process according to the present invention.

With reference to FIG. 2, the multi-antenna superimposed transmitting end of the present invention may include a receiving means for receiving signals from a base station; a coding means for encoding the signals from the base station using the coding matrix; and a plurality of transmitting antennas for transmitting the coded signals.

Assume the transmission channel of a 2×2 multi-antenna system is $$H = \begin{bmatrix} h_{11} & h_{12} \\ h_{21} & h_{22} \end{bmatrix},$$

where $h_{11}$ is a channel impulse response between a first transmitting antenna and a first receiving antenna; $h_{12}$ is a channel impulse response value between the first transmitting antenna and a second receiving antenna; $h_{21}$ is a channel impulse response value between a second transmitting antenna and the first receiving antenna; and $h_{22}$ is a channel impulse response value between the second transmitting antenna and the second receiving antenna.

The received signal of the first receiving antenna is according to Equations 3 and 4:

$$y_{11} = h_{11}(as_1 + bs_2 + cs_3 + ds_4) + h_{12}(as_5 + bs_6 + cs_7 + ds_8) + n_{11} \quad [\text{Eqn. 3}]$$

$$y_{12} = h_{11}(-e^*s_5^* - f^*s_6^* - g^*s_7^* - h^*s_8^*) + h_{12}(e^*s_1^* + f^*s_2^* + g^*s_3^* + h^*s_4^*) + n_{12} \quad [\text{Eqn. 4}]$$

The received signal of the second receiving antenna is Equations 5 and 6:

$$y_{21} = h_{21}(as_1 + bs_2 + cs_3 + ds_4) + h_{22}(as_5 + bs_6 + cs_7 + ds_8) + n_{21} \quad [\text{Eqn. 5}]$$

$$y_{22} = h_{21}(-e^*s_5^* - f^*s_6^* - g^*s_7^* - h^*s_8^*) + h_{22}(e^*s_1^* + f^*s_2^* + g^*s_3^* + h^*s_4^*) + n_{22} \quad [\text{Eqn. 6}]$$

where: $n_{11}$ and $n_{12}$ are white Gaussian noises.

As seen from Equations 3 and 4, if the items involving the constants c and d as well as g and h are moved to the left side of the equation, Equations 7 and 8 can be obtained, where "*" indicates the conjugate operation:

$$\begin{aligned} u_1 &= y_{11} - c(h_{11}s_3 + h_{12}s_7) - d(h_{11}s_4 + h_{12}s_8) \\ &= a(h_{11}s_1 + h_{12}s_5) + b(h_{11}s_2 + h_{12}s_6) + n_{11} \end{aligned} \quad [\text{Eqn. 7}]$$

$$\begin{aligned} u_2 &= y_{12} - g^*(h_{12}s_3^* - h_{11}s_7^*) - h^*(h_{12}s_4^* + h_{11}s_8^*) \\ &= e^*(-h_{11}s_5^* + h_{12}s_1^*) + f^*(-h_{11}s_6^* + h_{12}s_2^*) + n_{12} \end{aligned} \quad [\text{Eqn. 8}]$$

As seen from Equations 5 and 6, if the items involving the constants c and d and g and h are moved to the left side of the equation, Equation 9 and 10 can be obtained:

$$\begin{aligned} u_1' &= y_{21} - c(h_{21}s_3 + h_{22}s_7) - d(h_{21}s_4 + h_{22}s_8) \\ &= a(h_{21}s_1 + h_{22}s_5) + b(h_{21}s_2 + h_{22}s_6) + n_{21} \end{aligned} \quad [\text{Eqn. 9}]$$

$$\begin{aligned} u_2' &= y_{22} - g^*(h_{22}s_3^* - h_{21}s_7^*) - h^*(h_{22}s_4^* + h_{21}s_8^*) \\ &= e^*(-h_{21}s_5^* + h_{22}s_1^*) + f^*(-h_{21}s_6^* + h_{22}s_2^*) + n_{22} \end{aligned} \quad [\text{Eqn. 10}]$$

With Equations 7 and 8, since there are items which can be cancelled, both ends of the formula are multiplied with a constant, and the following are obtained:

$$h_{11}^* u_1 = a(|h_{11}|^2 s_1 + h_{11}^* h_{12} s_5) + b(|h_{11}|^2 s_2 + h_{11}^* h_{12} s_6) + h_{11}^* n_{11} \quad [\text{Eqn. 11}]$$

$$h_{12} u_2^* = e(|h_{12}|^2 s_1 - h_{11} h_{12}^* s_5) + f(|h_{12}|^2 s_2 - h_{11} h_{12}^* s_6) + h_{12} n_{12}^* \quad [\text{Eqn. 12}]$$

$u_1$ can be multiplied by the conjugate $h_{11}^*$, of the channel impulse response value $h_{11}$, and conjugate $u_2^*$ of $u_2$ can be multiplied by the channel $h_{12}$.

If a=e, b=f, then $$h_{11}^* u_1 + h_{12} u_2^* = a(|h_{11}|^2 + |h_{12}|^2)s_1 + b(|h_{11}|^2 + |h_{12}|^2)s_2 + h_{11}^* n_{11} + h_{12} n_{12}^* \quad [\text{Eqn. 13}]$$

With Equation 9 and 10, since there are items which can be cancelled, both ends of the formula are multiplied with a constant, $u_1'$ is multiplied by $h_{21}^*$, and $h_{22}$ by conjugate $(u_2')^*$ of $u_2'$.

$$h_{21}^* u_1' = a(|h_{21}|^2 s_1 + h_{21}^* h_{22} s_5) + b(|h_{21}|^2 s_2 + h_{21}^* h_{22} s_6) + h_{21}^* n_{21} \quad [\text{Eqn. 14}]$$

$$h_{22}(u_2')^* = e(|h_{22}|^2 s_1 - h_{21}^* h_{22} s_5) + f(|h_{22}|^2 s_2 - h_{21}^* h_{22} s_6) + h_{22} n_{22}^* \quad [\text{Eqn. 15}]$$

If a=e, b=f, then $$h_{21}^* u_1' + h_{22}(u_2')^* = a(|h_{21}|^2 + |h_{22}|^2) s_1 + b(|h_{21}|^2 + |h_{22}|^2) s_2 + h_{21}^* n_{21} + h_{22} n_{22}^* \quad [\text{Eqn. 16}]$$

Usually, $u_1'$ can be multiplied by the conjugate $h_{21}^*$ of the channel $h_{21}$, and conjugate $(u_2')^*$ of $u_2'$, can be multiplied by the channel $h_{22}$.

It can be seen from Formulae (13) and (16) that the conventional four known items are reduced to two. If the maximum likelihood coding is adopted for Equation 13 and 16, the complexity will be $M^2$. Similarly, the symbols s1 and s2 can be interpreted.

In order to further simplify Equation 7 and 8, both ends of the equations are multiplied with a constant, and the following can be obtained:

$$h_{12}^* u_1 = a(|h_{12}|^2 s_5 + h_{12}^* h_{11} s_1) + b(h_{12}^* h_{11} s_2 + |h_{12}|^2 s_6) + h_{12}^* n_{11} \quad [\text{Eqn. 17}]$$

$$h_{11} u_2^* = e(-|h_{11}|^2 s_5 + h_{11} h_{12}^* s_1) + f(-|h_{11}|^2 s_6 + h_{11} h_{12}^* s_2) + h_{11} n_{12}^* \quad [\text{Eqn. 18}]$$

With Equation 17 and 18, all the cancelable items are cancelled. If a=e, b=f, then:

$$h_{12}^* u_1 - h_{11} u_2^* = a(|h_{12}|^2 + |h_{11}|^2) s_5 + b(|h_{11}|^2 + |h_{12}|^2) s_6 + h_{11}^* n_{11} - h_{12} n_{12} \quad [\text{Eqn. 19}]$$

Usually, $u_1$ is multiplied by the conjugate $h_{12}^*$ of the channel impulse response value $h_{12}$, and conjugate $u_2^*$ of $u_2$ is multiplied by the channel impulse response value $h_{11}$.

In order to further simplify Equations 9 and 10, both ends of the equations are multiplied with a constant, and the following are obtained:

$$h_{22}^* u_1' = a(|h_{22}|^2 s_5 + h_{22}^* h_{21} s_1) + b(h_{22}^* h_{21} s_2 + |h_{22}|^2 s_6) + h_{22}^* n_{21} \quad [\text{Eqn. 20}]$$

$$h_{21}(u_2')^* = e(-|h_{21}|^2 s_5 + h_{21} h_{22}^* s_1) + f(-|h_{21}|^2 s_6 + h_{21} h_{22}^* s_2) + h_{21} n_{22}^* \quad [\text{Eqn. 21}]$$

With Equations 20 and 21, and all the cancelable items are cancelled. If a=e, b=f, then:

$$h_{22}^* u_1' - h_{21}(u_2')^* = a(|h_{22}|^2 + |h_{21}|^2) s_5 + b(|h_{22}|^2 + |h_{21}|^2) s_6 + h_{22}^* n_{21} - h_{21} n_{22}^* \quad [\text{Eqn. 22}]$$

$u_1'$ is multiplied by the conjugate $h_{22}^*$ of the channel $h_{22}$, and conjugate $u_{22}^*$ of $u_2$ is multiplied by the channel $h_{21}$.

It can be seen from Equations 20 and 22 that the four unknowns are reduced to two. The maximum likelihood sequential decoding is performed with Equations 20 and 22, the complexity is. It is possible to interpret the two transmitted symbols s5 and s6.

Similarly, if all the items involving the a, b, e and f factors in Equations 3 and 4 are moved to the left side of the equation, then:

$$v_1 = y_{11} - a(h_{11} s_1 + h_{12} s_5) - b(h_{11} s_2 + h_{12} s_6) \quad [\text{Eqn. 23}]$$
$$= c(h_{11} s_3 + h_{12} s_7) + d(h_{11} s_4 + h_{12} s_8) + n_{11}$$

$$v_2 = y_{12} - e^*(-h_{11} s_5^* + h_{12} s_1^*) - f^*(-h_{11} s_6^* + h_{12} s_2^*) \quad [\text{Eqn. 24}]$$
$$= g^*(-h_{11} s_7^* + h_{12} s_3^*) + h^*(-h_{11} s_8^* + h_{12} s_4^*) + n_{12}$$

$$v_1' = y_{21} - a(h_{21} s_1 + h_{22} s_5) - b(h_{21} s_2 + h_{22} s_6) \quad [\text{Eqn. 25}]$$
$$= c(h_{21} s_3 + h_{22} s_7) + d(h_{21} s_4 + h_{22} s_8) + n_{21}$$

$$v_2' = y_{22} - e^*(-h_{21} s_5^* + h_{22} s_1^*) - f^*(-h_{21} s_6^* + h_{22} s_2^*) \quad [\text{Eqn. 26}]$$
$$= g^*(-h_{21} s_7^* + h_{22} s_3^*) + h^*(-h_{21} s_8^* + h_{22} s_4^*) + n_{22}$$

As seen from Equations 23 and 24, there are also many items which can be cancelled. The equations are multiplied with their respective coefficients, the following are obtained:

$$h_{11}^* v_1 = c(|h_{11}|^2 s_3 + h_{11}^* h_{12} s_7) + d(|h_{11}|^2 s_4 + h_{11}^* h_{12} s_8) + h_{11}^* n_{12} \quad [\text{Eqn. 27}]$$

$$h_{12} v_2^* = g^*(|h_{12}|^2 s_3 - h_{11}^* h_{12} s_7) + h^*(|h_{12}|^2 - h_{12} h_{11}^*) + h_{12} n_{12}^* \quad [\text{Eqn. 28}]$$

If $c = g^*$, and $d = h^*$, then:

$$h_{11}^* v_1 + h_{12} v_2^* = c(|h_{11}|^2 + |h_{12}|^2) s_3 + d(|h_{11}|^2 + |h_{12}|^2) s_4 + h_{11}^* n_{12} + h_{12} n_{12}^* \quad [\text{Eqn. 29}]$$

As seen from Equations 25 and 26, there are also many items which can be cancelled. The equations are multiplied with their respective coefficients, the following are obtained:

$$h_{21}^* v_1' = c(|h_{21}|^2 s_3 + h_{21}^* h_{22} s_7) + d(|h_{21}|^2 s_4 + h_{21}^* h_{22} s_8) + h_{21}^* n_{21} \quad [\text{Eqn. 30}]$$

$$h_{22}(v_2')^* = g^*(|h_{22}|^2 s_3 - h_{21}^* h_{22} s_7) + h^*(|h_{22}|^2 - h_{22} h_{21}^*) + h_{22} n_{22}^* \quad [\text{Eqn. 31}]$$

If c=g and d=h, then:

$$h_{21}^* v_1' + h_{22}(v_2')^* = c(|h_{21}|^2 + |h_{22}|^2) s_3 + d(|h_{21}|^2 + |h_{22}|^2) s_4 + h_{21}^* n_{21} + h_{22} n_{22}^* \quad [\text{Eqn. 32}]$$

It can be seen from Equation 29 and 32 that the previous four unknowns are reduced to two. The maximum likelihood traverse decoding are performed on Equations 29 and 32, the complexity is $M^2$. It is possible to interpret the two transmitted symbols s3 and s4.

Similarly, Equations 23 and 24 are multiplied with different coefficients, and the following are obtained:

$$h_{12}^* v_1 = c(|h_{12}|^2 s_7 + h_{11} h_{12}^* s_3) + d(|h_{12}|^2 s_8 + h_{11} h_{12}^* s_4) + h_{12}^* n_{11} \quad [\text{Eqn. 33}]$$

$$h_{11} v_2^* = g(-|h_{11}|^2 s_7 + h_{11} h_{12}^* s_3) + h(-|h_{11}|^2 s_8 + h_{11} h_{12}^* s_4) + h_{11} n_{12}^* \quad [\text{Eqn. 34}]$$

If, $c = g^*$, and $d = h^*$, then:

$$h_{12}^* v_1 - h_{11} v_2^* = c(|h_{11}|^2 + |h_{12}|^2) s_7 + d(|h_{11}|^2 + |h_{12}|^2) s_8 + h_{11}^* n_{11} - h_{12} n_{12}^* \quad [\text{Eqn. 35}]$$

Similarly, different operations are performed on Equations 25 and 26, i.e., $v_1'$ is multiplied by conjugate $h_{22}^*$ of the channel impulse response $h_{22}$, and conjugate $v_2^*$ of $v_2$ is multiplied by the channel impulse response value $h_{21}$, the following are obtained:

$$h_{22}^* v_1' = a(|h_{22}|^2 s_7 + h_{22}^* h_{21} s_3) + b(h_{22}^* h_{21} s_4 + |h_{22}|^2 s_8) + h_{22}^* n_{21} \quad [\text{Eqn. 36}]$$

$$h_{21}(v_2')^* = e(-|h_{21}|^2 s_7 + h_{21} h_{22}^* s_3) + f(-|h_{21}|^2 s_8 + h_{21} h_{22}^* s_4) + h_{21} n_{22}^* \quad [\text{Eqn. 37}]$$

If, $c = g^*$, $d = h^*$, then:

$$h_{22}^* v_1' - h_{21}(v_2')^* = c(|h_{22}|^2 + |h_{21}|^2) s_7 + d(|h_{22}|^2 + |h_{21}|^2) s_8 + h_{22}^* n_{21} - h_{21} n_{22}^* \quad [\text{Eqn. 38}]$$

It can be seen from Equations 35 and 38 that the four unknowns have been cancelled to two. The maximum likelihood transversal is performed on the two unknowns values with a complexity of $M^2$. It is possible to interpret the two symbols s7 and s8.

As described above, in the receiver, after the four transmitted symbols are superimposed, the mathematical properties of the coding matrix can be used to easily decode the eight transmitted symbols. The operational complexity changes from previous $M^8$ to $4M^2$. Under a big modulation constellation, such simplification can save operational complexity.

As mentioned above, the simplification method is mathematically feasible. However, in an actual communication system, it is impossible to reach such a high transmission rate. This is because Equations 5 and 6 are respectively obtained by moving the items with c, d, g and h in Equations 3 and 4 to the left side of the equations, which are unknown at the receiving end. Therefore, processing can only be performed at the transmitting end to make the receiving end know the accurate values of the items with c, d, g and h.

$$C = \begin{bmatrix} bs_3 & as_1 + bs_3 & -cs_2^* - ds_4^* \\ bs_4 & as_2 + bs_4 & cs_1^* + ds_3^* \end{bmatrix}$$

According to the present invention, the solution to be adopted lies in: a sampling method that has been adopted at the transmitting end. Before transmitting the symbols in the coding matrix c, at the first timing, a transiting time slot is especially used to transmit a transmission symbol $$\begin{bmatrix} cs_3 + ds_4 \\ cs_7 + ds_8 \end{bmatrix}$$

with c, d, g and h. Then, the transmission matrix of the transmitting end becomes:

[Eqn. 39]

$$\begin{bmatrix} cs_3 + ds_4 & as_1 + bs_2 + cs_3 + ds_4 & -(e^*s_5^* + f^*s_6^* + g^*s_7^* + h^*s_8^*) \\ cs_7 + ds_8 & as_5 + bs_6 + cs_7 + ds_8 & e^*s_1^* + f^*s_2^* + g^*s_3^* + h^*s_4^* \end{bmatrix}$$

Assume that the channel is a slow-changing channel, three columns in Matrix (39) are respectively the three transmission symbols. For these three transmission symbols, there is no channel change. For the symbol sent at the first timing, the signal received by the first receiving antenna is:

$r_1 = h_{11}(cs_3+ds_4) + h_{12}(cs_7+ds_8) + n_1$ [Eqn. 40]

The received signal on the second receiving antenna is:

$r_2 = h_{21}(cs_3+ds_4) + h_{22}(cs_7+ds_8) + n_2$ [Eqn. 41]

At this time, the receiver does not need to know $s_3$, $s_4$, $s_5$ or $s_6$. The receiver only needs to know the values of $(cs_3+ds_4)$ and $(cs_7+ds_8)$. After the values of $(cs_3+ds_4)$ and $(cs_7+ds_8)$ are known, it is possible to use Equations 7, 8, 9 and 10. Then, let $X_1=(cs_3+ds_4)$, $X_2=(cs_7+ds_8)$, Equations 40 and 41 becomes:

$r_1 = h_{11}X_1 + h_{12}X_2 + n_1$ [Eqn. 42]

$r_2 = h_{21}X_1 + h_{22}X_2 + n_2$ [Eqn. 43]

Solutions can be easily found for a binary linear equation group formed by Equations 42 and 43.

The cost of the above operations is to reduce the coding rate from R=4 to R=8/3=2.67. However, the advantage is that the operations at the receiver can be simplified. On the whole, the coding rate will still be higher than the coding rate R=2 in the IEEE802.16e solution. Complexity comparisons between the two are shown in the following table.

TABLE 1

Comparison of IEEE802.16e and the Present Invention

|  | Coding Rate R | Complexity |
| --- | --- | --- |
| IEEE802.16e | 2 | $M^4$ |
| Present invention | 8/3 = 2.67 | $4M^2$ |

It can be seen that the present invention provides a simple method to be implemented. When the transmitting end adopts two symbols to be superimposed, the coding matrix is:

The first column consists of eliminated entries needed for decoding, and the second and third columns are the superimposed transmission symbols. At Timing 0, the two transmitting antennae send the following symbol:

$$\begin{bmatrix} bs_3 \\ bs_4 \end{bmatrix},$$

where each transmitting antenna transmits the corresponding matrix row.

At the following two moments, following symbols are transmitted:

$$\begin{bmatrix} as_1 + bs_3 & -cs_2^* - ds_4^* \\ as_2 + bs_4 & cs_1^* + ds_3^* \end{bmatrix}$$

a, b, c and d are constant coefficients.

Here, examples are given for the values of the 4 coefficients:

$$a = e^{j\frac{\pi}{4}}, b = e^{j\frac{3\pi}{4}}, c = e^{j\frac{5\pi}{4}}, d = e^{j\frac{7\pi}{4}}$$

As described above, when the transmitting end adopts 4 symbols for superimposition, it will adopt a coding solution as shown in $$\begin{bmatrix} cs_3 + ds_4 & as_1 + bs_2 + cs_3 + ds_4 & -(e^*s_5^* + f^*s_6^* + g^*s_7^* + h^*s_8^*) \\ cs_7 + ds_8 & as_5 + bs_6 + cs_7 + ds_8 & e^*s_1^* + f^*s_2^* + g^*s_3^* + h^*s_4^* \end{bmatrix}$$

The specific process is:

At startup, the transmission symbols transmitted on the two transmitting antennae of the transmitter is $$\begin{bmatrix} cs_3 + ds_4 \\ cs_7 + ds_8 \end{bmatrix}.$$

At the two time slots after Symbol '1' has been transmitted, respectively the following coding matrix are transmitted $$C = \begin{bmatrix} as_1 + bs_2 + cs_3 + ds_4 & -(e^*s_5^* + f^*s_6^* + g^*s_7^* + h^*s_8^*) \\ as_5 + bs_6 + cs_7 + ds_8 & e^*s_1^* + f^*s_2^* + g^*s_3^* + h^*s_4^* \end{bmatrix}$$

a, b, c, d, e, f, g and h are constant coefficients, expressing the rotation of phases, $$a = e^{j\frac{\pi}{8}},$$

b, c, d, e, f, g and h are respectively added with a phase of $$e^{j\frac{\pi}{8}}$$

to the phase of the previous coefficient.

When the transmitting end adopts more than four symbols for superimposition, assume that the number of the superimposed symbols is N, N=2*k, k=1, 2, 3 . . . , then the coding matrix C is:

$$C = \begin{bmatrix} c_{k+1}s_{k+1} + c_{k+2}s_{k+2} + \ldots + c_{\frac{3k}{2}}s_{\frac{3k}{2}} & c_1s_1 + c_2s_2 + \ldots c_ks_k & -(c_{k+1}s_{k+1} + c_{k+2}s_{k+2} + \ldots c_{2k}s_{2k})* \\ d_{\frac{3k}{2}+1}s_{\frac{3k}{2}+1} + d_{\frac{3k}{2}+2}s_{\frac{3k}{2}+2} + \ldots + d_{2k}s_{2k} & c_{k+1}s_{k+1} + c_{k+2}s_{k+2} + \ldots c_{2k}s_{2k} & (c_1s_1 + c_2s_2 + \ldots c_ks_k)* \end{bmatrix}$$

Firstly, the symbol is transmitted:

$$\begin{bmatrix} c_{k+1}s_{k+1} + c_{k+2}s_{k+2} + \ldots c_{\frac{3k}{2}}s_{\frac{3k}{2}} \\ d_{\frac{3k}{2}+1}s_{\frac{3k}{2}+1} + d_{\frac{3k}{2}+2}s_{\frac{3k}{2}+2} + \ldots d_{2k}s_{2k} \end{bmatrix}$$

Then, the symbol is transmitted:

$$\begin{bmatrix} c_1s_1 + c_2s_2 + \ldots c_ks_k & -(c_{k+1}s_{k+1} + c_{k+2}s_{k+2} + \ldots c_{2k}s_{2k})* \\ c_{k+1}s_{k+1} + c_{k+2}s_{k+2} + \ldots + c_{2k}s_{2k} & (c_1s_1 + c_2s_2 + \ldots + c_ks_k)* \end{bmatrix}$$

Where: $c_k$, $d_k$ are both constant coefficients. Before being superimposed, each symbol is subject to phase rotation. The weighted constant is the phase rotation value. An initial phase is:

$$e^{j\frac{\pi}{2k}},$$

with an increment of $$e^{j\frac{\pi}{2k}}.$$

Simulation has been made of the symbol error rate curve of the present invention and the IEEE802.16e solution under a Rayleigh fading channel and AWGN channel. QPSK and 8psk modulation constellations are respectively adopted.

TABLE 2

| | Simulation Conditions | |
|---|---|---|
| | IEEE802.16e | Present Invention |
| Channel model | Rayleigh/fd = 100 Hz | Rayleigh/fd = 100 Hz |
| Modulation | QPSK/8psk | QPSK/8psk |
| Channel encoding | none | none |
| Transmitting mode | 2 × 2 | 2 × 2 |
| Code rate | 2 | 2.67 |
| Complexity | $M^4$ | $4M^2$ |

Figure 3:
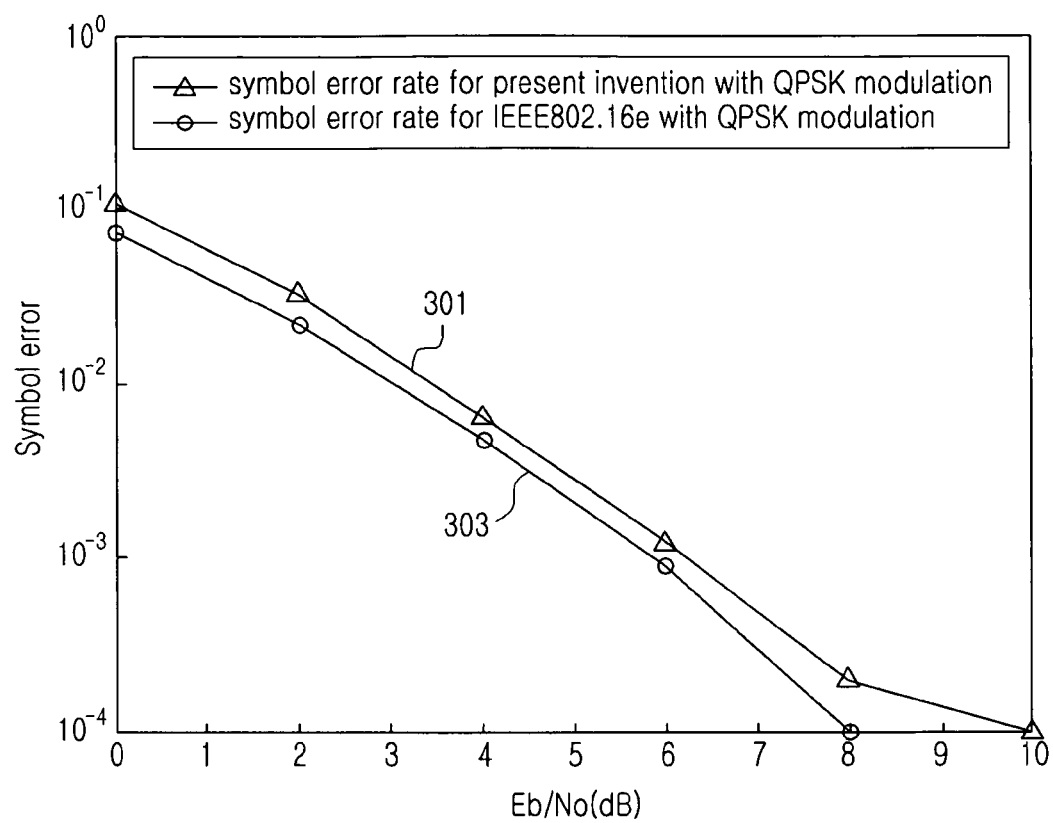
FIG. 3 illustrates a comparison of coding performances between IEEE802.16e and embodiments according to the present invention in an AWGN channel.
Figure 4:
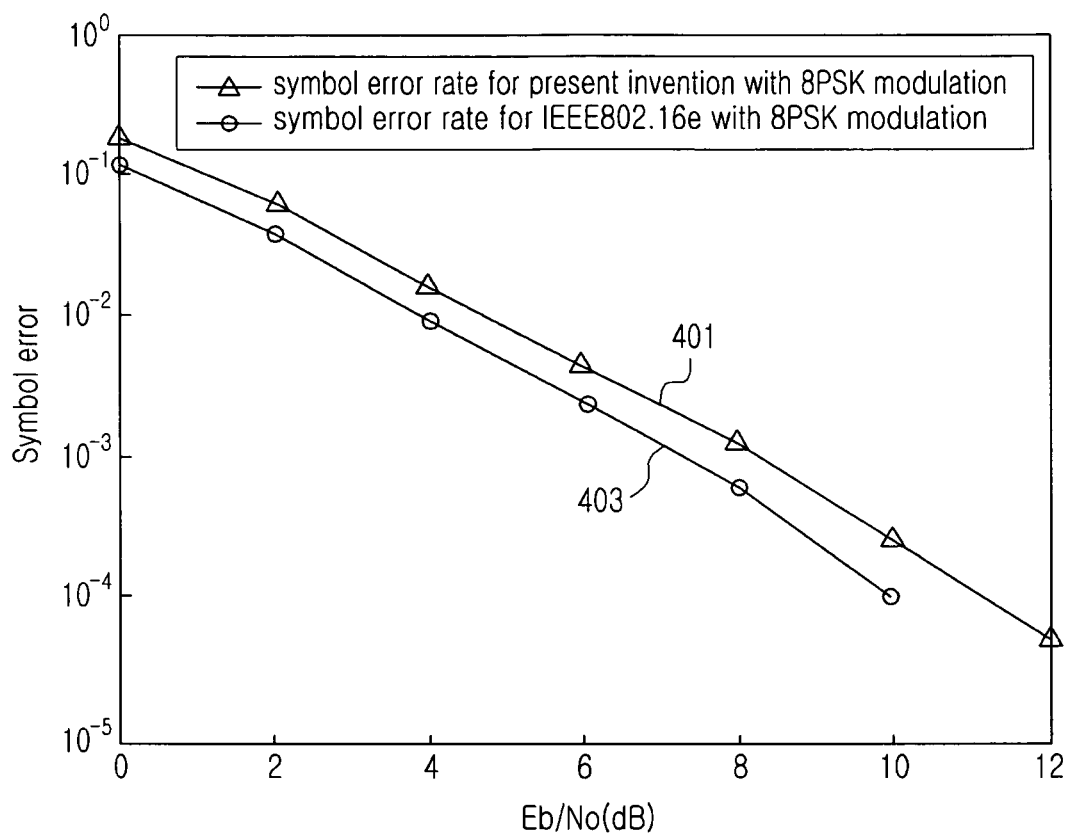
FIG. 4 illustrates a comparison of coding performances between IEEE802.16e and the present invention in a Rayleigh channel.

When 16QAM modulation is adopted, the maximum likelihood method of transversal has a complexity reaching 16^4=65535, the overhead is too big. Only low 8PSK and QPSK modulations are adopted for simulation. The channel model is JAKES' Rayleigh. Here, a Doppler frequency shift is 100 Hz. The simulation results are shown in FIGS. 3 and 4. It can be seen that except for slightly poorer error code performance, the coding method of the present invention has resulted better coding rate and receiver complexity than the IEEE802.16e solution.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting symbols in a communication system, the method comprising:
    dividing N symbols to be transmitted at substantially the same time into a first group and a second group, performing a first processing on each of a plurality of symbols in the first group to obtain a first group of superimposed symbols, and performing a second processing on each of a plurality of symbols in the second group to obtain a second group of superimposed symbols; and
    transmitting each of the first group of superimposed symbols by a first antenna, and transmitting corresponding symbols in the second group of superimposed symbols by a second antenna, wherein the first processing and the second processing respectively include a conjugate cancellation operation, wherein the conjugate cancelation operation includes a weighted operation and a conjugate operation, and
    wherein when N equals 8, the symbols transmitted by the first antenna at Timing i+2, i+1 and i are: cs3+ds4, as1+bs2+cs3+ds4 and −(e*s5*+f*s6*+g*s7*+h*s8*) respectively, where a, b, c, d, e, f, g and h are respectively complex constants, "*" indicates the conjugate operation, and s1 to s8 are respectively serial numbers of the symbols to be transmitted.

2. The method according to claim 1, wherein the symbols transmitted by the second antenna are $cs_7+ds_8$, $as_5+bs_6+cs_7+ds_8$ and $e^*s_1^*+f^*s_2^*+g^*s_3^*+h^*s_4^*$.

3. The method according to claim 1, wherein $a=e^*$, $b=f^*$, $c=g^*$, and $d=h^*$.

4. A method for transmitting symbols in a communication system, the method comprising:
dividing N symbols to be transmitted at substantially the same time into a first group and a second group, performing a first processing on each of a plurality of symbols in the first group to obtain a first group of superimposed symbols, and performing a second processing on each of a plurality of symbols in the second group to obtain a second group of superimposed symbols; and
transmitting each of the first group of superimposed symbols by a first antenna, and transmitting corresponding symbols in the second group of superimposed symbols by a second antenna, wherein the first processing and the second processing respectively include a conjugate cancellation operation,
wherein the conjugate cancellation operation includes a weighted operation and a conjugate operation, and
wherein when N equals 4, the symbols transmitted by the first antenna at Timing i+2, i+1 and i are: $bs_3$, $as_1+bs_3$ and $-(cs_2^*+ds_4^*)$ respectively, where a, b, c and d are respectively complex constants, "*" indicates the conjugate operation, and, s1 to s4 are respectively serial numbers of the symbols to be transmitted.

5. The method according to claim 4, wherein the symbols transmitted by the second antenna are respectively $bs_4$, $as_2+bs_4$ and $cs_1^*+ds_3^*$.

6. An apparatus for transmitting symbols in a communication system, comprising:
a receiver configured to receive symbols;
a coder configured to encode the received symbols, and
a plurality of antennas configured to transmit coded symbols;
the coder further configured to divide N symbols to be transmitted at substantially the same time into a first group and a second group, perform a first processing on each of a plurality of symbols in the first group to obtain a first group of superimposed symbols, and perform a second processing on each of a plurality of symbols in the second group to obtain a second group of superimposed symbols, and wherein a first antenna is configured to transmit each of the first group of superimposed symbols one by one, and a second antenna is configured to transmit corresponding symbols in the second group of superimposed symbols, and wherein the first processing and the second processing respectively include a conjugate cancellation operation, wherein the conjugate cancellation operation includes a weighted operation and a conjugate operation, and
wherein when N equals 8, the symbols transmitted by the first antenna at Timing i+2, i+1 and i are: $cs_3+ds_4$, $as_1+bs_2+cs_3+ds_4$ and $-(e^*s_5^*+f^*s_6^*+g^*s_7^*+h^*s_8^*)$ respectively, where a~b, c, d~e, f~g and h are respectively complex constants, "*" indicates the conjugate operation, and s1 to s8 are respectively serial numbers of the symbols to be transmitted.

7. The apparatus according to claim 6, wherein the symbols transmitted by the second antenna are respectively $cs_7+ds_8$, $as_5+bs_6+cs_7+ds_8$ and $e^*s_1^*+f^*s_2^*+g^*s_3^*+h^*s_4^*$.

8. The apparatus according to claim 6, wherein $a=e^*$, $b=f^*$, $c=g^*$, $d=h^*$.

9. An apparatus for transmitting symbols in a communication system, comprising:
a receiver configured to receive symbols;
a coder configured to encode the received symbols, and
a plurality of antennas configured to transmit coded symbols;
the coder further configured to divide N symbols to be transmitted at substantially the same time into a first group and a second group, perform a first processing on each of a plurality of symbols in the first group to obtain a first group of superimposed symbols, and perform a second processing on each of a plurality of symbols in the second group to obtain a second group of superimposed symbols, and wherein a first antenna is configured to transmit each of the first group of superimposed symbols, and a second antenna is configured to transmit corresponding symbol in the second group of superimposed symbols, and wherein the first processing and the second processing respectively include a conjugate cancellation operation,
wherein the conjugate cancellation operation includes a weighted operation and a conjugate wherein when N equals to 4, the symbols transmitted by the first antenna at Timing i+2,i+1 and i are bs3, as1+bs3 and -(cs2+ds4) respectively, where a, b, c and d are respectively complex constants, "*" indicates the conjugate operation, and, s1 and s4 are respectively serial numbers of the symbols to be transmitted.

10. The apparatus according to claim 8, wherein the symbols are transmitted by the second antenna are respectively $bs_4$, $as_2+bs_4$ and $cs_1^*+ds_3^*$.

* * * * *